(12) United States Patent
Illidge (10) Patent No.: US 6,542,752 B1
(45) Date of Patent: Apr. 1, 2003

(54) CDMA MULTIPLE CARRIER PAGING CHANNEL OPTIMIZATION

(75) Inventor: William E. Illidge, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/563,400

(22) Filed: May 3, 2000

Related U.S. Application Data

(63) Continuation of application No. 08/997,780, filed on Dec. 24, 1997.
(51) Int. Cl.[7] .............................. H04Q 7/08; H04Q 7/10; H04Q 7/12; H04Q 7/14
(52) U.S. Cl. ...................... 455/458; 455/435; 455/466; 370/328; 370/335; 370/342; 340/7.21
(58) Field of Search ............................... 455/458, 515, 455/435, 434, 422, 507, 500, 550, 466, 517, 9; 370/328, 329, 335, 342, 410, 437, 438, 441; 340/7.21, 7.22, 7.23, 7.24, 7.27

(56) References Cited

U.S. PATENT DOCUMENTS

| 5,715,516 | A | * | 2/1998 | Howard et al. | 455/422 |
|---|---|---|---|---|---|
| 5,797,097 | A | * | 8/1998 | Roach, Jr. et al. | 455/456 |
| 5,878,036 | A | * | 3/1999 | Spartz et al. | 370/335 |
| 5,878,038 | A | * | 3/1999 | Willey | 370/335 |
| 5,878,351 | A | * | 3/1999 | Alanara et al. | 455/466 |

* cited by examiner

Primary Examiner—William Trost
Assistant Examiner—Keith Ferguson (57) ABSTRACT

A method of reducing paging channel usage in a CDMA communication system. Each mobile switching centre maintains in its visitor location registry information regarding a paging channel or carrier frequency that each mobile station registered is monitoring. Then, when it comes time to send a page to a mobile station, the mobile switching centre looks up the information and appends it to the page which is sent to all basestation transceivers. The basestation transceivers extract the information and identify the paging channel the mobile station to which the page is addressed is monitoring. The transceivers then broadcast the page message over their air interfaces on the identified paging channel.

27 Claims, 6 Drawing Sheets

FIG. 6

CDMA MULTIPLE CARRIER PAGING CHANNEL OPTIMIZATION

RELATIONSHIP TO PRIOR APPLICATIONS

This application is a continuation of U.S. Pat. No. 08/997,780 filed Dec. 24, 1997.

FIELD OF THE INVENTION

The invention relates to systems and methods for CDMA (code division multiple access) paging.

BACKGROUND OF THE INVENTION

In CDMA systems, a MS (mobile station) accesses the CDMA system on a particular carrier frequency. A single carrier frequency occupies 1.25 MHz in bandwidth, and provides capacity for a number of calls to proceed simultaneously in the same cell. Each carrier has associated with it a single paging channel and a plurality of traffic channels. The channels of a given carrier occupy the same frequency bandwidth and are differentiated from each other by a series of different orthogonal codes.

When a carrier reaches its capacity limit, it is desirable to increase the capacity of the system. One way of achieving this is to increase the number of carriers to greater than one, thereby creating a multi-carrier system.

In existing multi-carrier systems, a MS is capable of tuning to only one of the carrier frequencies at any instant in time. Because of this, the MS is only listening to one of the carrier frequency paging channels. In order to page a MS, the page must be sent on the paging channel of all of the carrier frequencies to ensure that it is sent on the paging channel the MS is listening to. To do this, the page message must be duplicated for each of the paging channels on which the message is to be sent. This results in an inefficient utilization of paging channel resources.

SUMMARY OF THE INVENTION

It is an object of the invention to obviate or mitigate one or more of the above identified disadvantages.

According to a first broad aspect, the invention provides in a CDMA (code division multiple access) communications system, a method for a mobile switching centre to send messages to mobile stations within its coverage area, the method first comprising the step of: for each mobile station, maintaining in a form accessible to the mobile switching centre a paging channel identifier which permits an identification of a paging channel the mobile station is monitoring; for each message to be sent to a particular mobile station the method further comprising the steps of: determining on the basis of the paging channel identifier associated with the particular mobile station the particular paging channel that the particular mobile station is monitoring; and broadcasting the message on the particular paging channel.

Preferably, each paging channel identifier comprises a band class and a channel number for the associated mobile station to identify the carrier frequency within the band class that the mobile station is operating or monitoring.

According to a second broad aspect, the invention provides a CDMA basestation transceiver for connection to a basestation controller, the CDMA basestation transceiver being adapted to: 1) include a paging channel identifier permitting the identification of a paging channel that a particular mobile station is monitoring in messages to the basestation controller relating to the particular mobile station; 2) when a message to be sent over the paging channel including said paging channel identifier is received from the basestation controller for transmission to the particular mobile station, identify the paging channel the particular mobile station is monitoring on the basis of the paging channel identifier, and send the message over that paging channel.

According to a third broad aspect, the invention provides a CDMA basestation controller for connection to a mobile switching centre and to a plurality of basestation transceivers, the basestation controller being adapted to: 1) receive a paging channel identifier permitting the identification of a paging channel that a particular mobile station is monitoring in messages received from any basestation transceiver relating to the particular mobile station; 2) include the paging channel identifier in messages to the mobile switching centre relating to the particular mobile station; 3) when a message including said paging channel identifier is received from the mobile switching centre for transmission to the particular mobile station, forward the message including said paging channel identifier to the basestation transceivers.

According to a fourth broad aspect, the invention provides a CDMA mobile switching centre for connection to a basestation controller and adapted to: 1) receive a paging channel identifier permitting the identification of a paging channel that a particular mobile station is monitoring in messages received from the basestation controller relating to the particular mobile station; 2) store the paging channel identifier; and 3) include the paging channel identifier in messages to the basestation controller relating to the particular mobile station.

Advantageously, by monitoring the current frequency that the MS is operating on, for example by monitoring registration messages or handoff messages which have been modified so that they include carrier frequency and band-class information, the MSC is able to know the current carrier frequency that the MS is operating on. Using this knowledge, the MSC is able to direct the page message to the paging channel for that carrier frequency. In a three carrier CDMA system, this would reduce paging channel usage by a $2/3$ (66%). In general, paging channel capacity would be reduced by $(n-1)/n*100\%$. In addition, time is saved since the basestation does not need to duplicate the page message for each paging channel.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
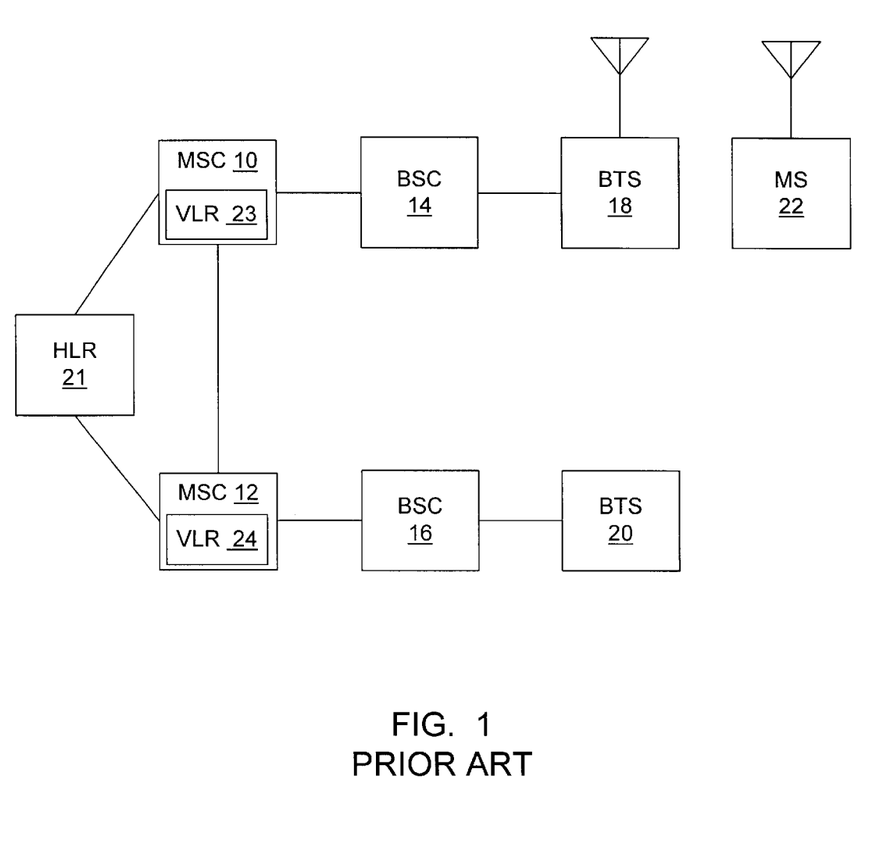
FIG. 1 is a block diagram of a conventional CDMA communications system.

Referring firstly to FIG. 1, a conventional CDMA mobile communications system includes a plurality of MSCs (mobile switching centres) 10,12 (only two shown) each connected to a respective plurality of BSCs (basestation controllers) 14,16 (only one shown per MSC), with each BSC being connected to a respective plurality of BTSs (basestation transceivers) 18,20 (only one shown per BSC). Each MSC 10,12 has access to one or more HLRs 21 (home location registries, only one shown) containing subscriber information for a plurality of subscriber's MSs (mobile stations), for feature capabilities for example. Each MSC 10,12 also has a respective VLR (visitor location registry) 23,24 containing information regarding all MSs which have registered with the particular MSC. According to network reference models, the VLRs may be internal or external to the MSCs. In the illustrated example, a single MS (mobile station) 22 is shown. It is assumed that there is a record in the HLR 21 pertaining to the MS 22. It is also assumed that for the time being MS 22 is within the coverage area of MSC 10, and as such MSC 10 will be referred to as the "current MSC". The MS is said to be within the coverage area of a given MSC if it is within a cell of a BTS controlled by that MSC.

When the MS 22 registers with the current MSC 10 (through the BTS 18 and BSC 14), a record is created in the VLR 23 in MSC 10, and the MS is assigned by the BTS to a particular band class and channel number. The band class identifies on which of several band classes the MS 22 is operating. In an existing CDMA standard the band classes include the 800 MHZ band class and the 1900 MHZ band class. The channel number identifies the particular carrier within the identified band class that the MS has been assigned. Every carrier contains a paging channel for sending messaging and control information. After the MS 22 registers, it begins monitoring the paging channel associated with its assigned carrier and band class.

A conventional VLR contains various information for each MS which has registered with the corresponding MSC, in some cases including the channel number for the MS. According to an embodiment of the invention, each record in the VLR also includes an additional field for storing the band class. As described in detail below, the channel number and band class information is initialized when the MS registers with the current MSC, and is updated whenever appropriate. The information is then used to route paging messages to the appropriate paging channel, thereby eliminating the need to send paging messages on all paging channels to ensure that the paging channel being monitored by the MS is covered. For the purposes of this description, the information used to identify the paging channel being monitored will be referred to as a PCI (paging channel identifier). For this example, the PCI will consist of the channel number and band class assigned to a particular MS as these values will permit the paging channel to be identified.

Figure 2:
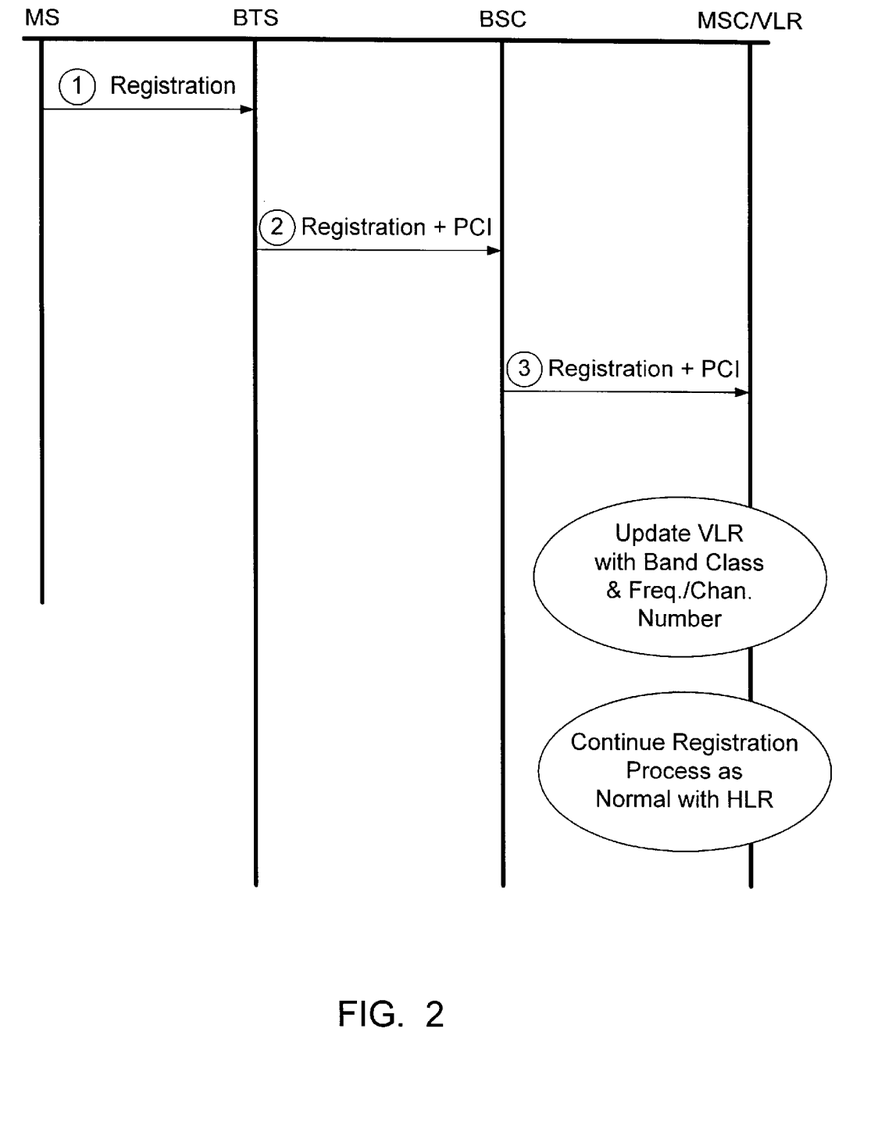
FIG. 2 is a message flow diagram for updating VLR (visitor location registry) information through mobile registration messaging.
Figure 3:
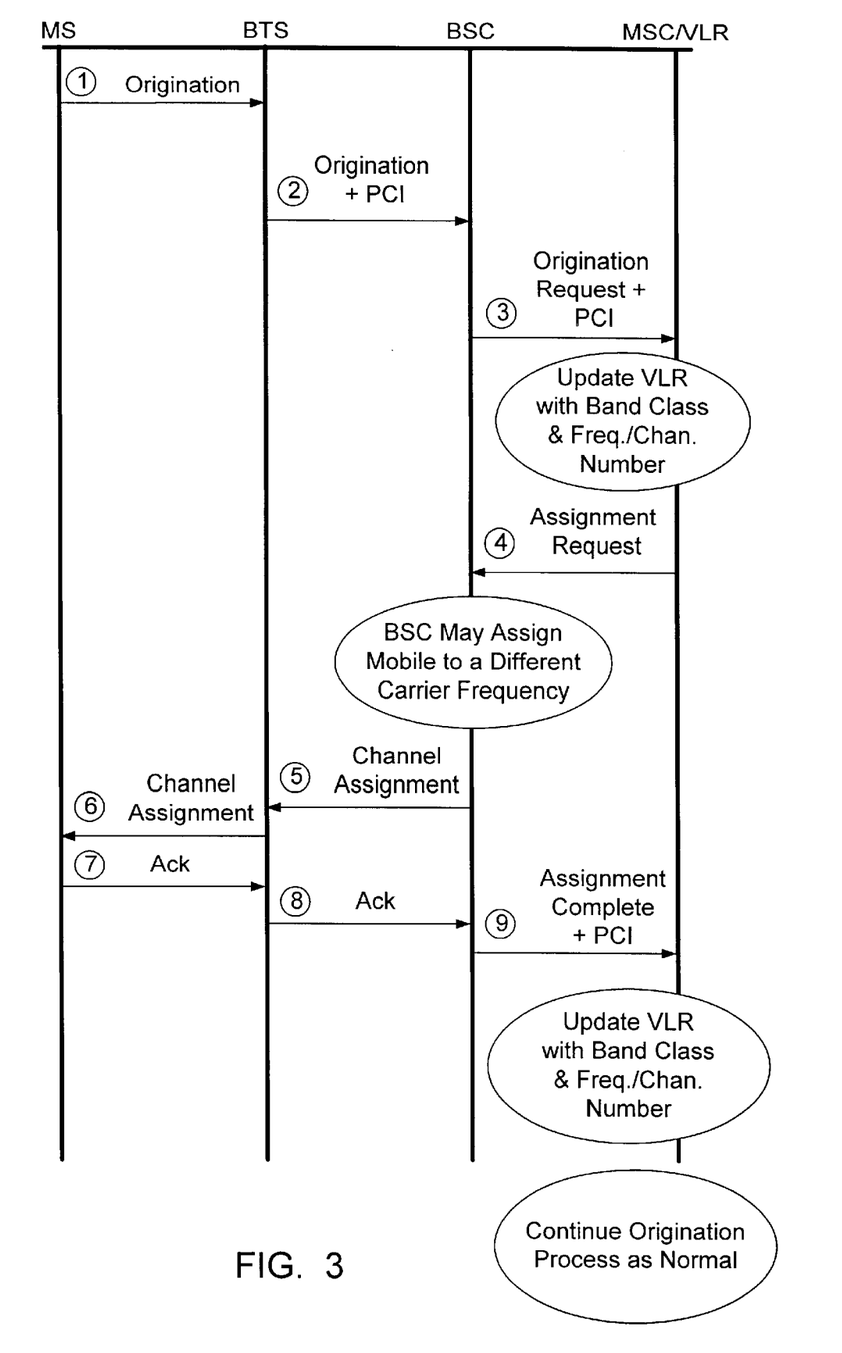
FIG. 3 is a message flow diagram for updating VLR information through mobile origination messaging.
Figure 4:
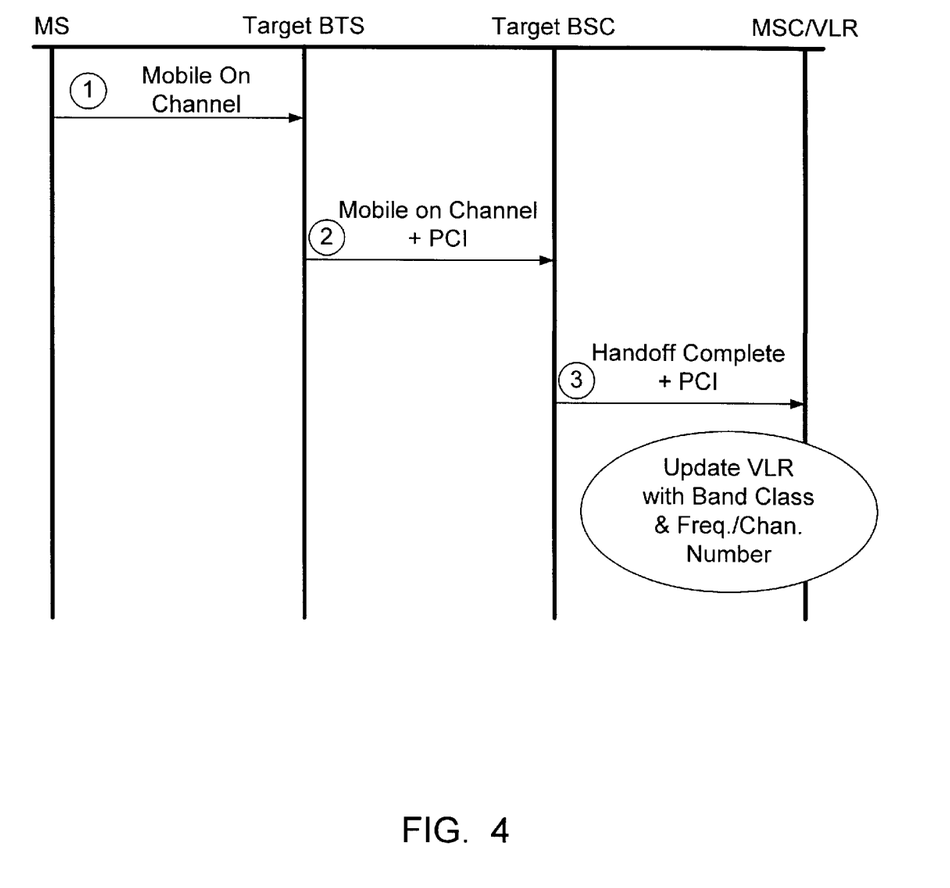
FIG. 4 is a message flow diagram for updating VLR information through mobile handoff complete messaging.

Referring now to FIGS. 2, 3 and 4, message flows for various ways to update the VLR with the PCI.

In FIG. 2, VLR update is achieved through mobile registration. Referring to the example of FIG. 1, it is assumed for this example that the MS 22 is registering with the current MSC 10. Registration is the process which a MS must undergo for example when the MS is turned on in a new coverage area, or moves from one coverage area to another. When a MS registers with the system, information about the MS and its operation is passed to the MSC. This information includes the location of the mobile (cell id or cell identifier), the type of registration, MIN (mobile identification number), ESN (electronic serial number), whether it is operating in slotted mode and slot cycle index, etc. In step 1, the MS 22 registers with the BTS 18 on a particular band class and carrier frequency. The BTS with which the MS 22 registers is the BTS for the cell in which the MS is located. How the particular band class and carrier frequency are selected is outside the scope of this invention. In step 2, the BTS 18 sends a registration message to the BSC 14. According to this embodiment of the invention, this registration message is modified to include the PCI for the MS 22. In step 3, the BSC 14 sends the registration message plus PCI to the current MSC 10. The current MSC 10 will extract the PCI information and update the VLR record for the MS identified by the registration message (according to its ESN and MIN). Following this, the rest of the normal registration process takes place with the HLR 21. Normal registration processes are well known in the art and will not be described further here.

In FIG. 3, VLR update is achieved through MS origination message flow. An origination occurs when an MS wants to request a call setup over a traffic channel, for example. In step 1, the MS 22 sends an origination message to the BTS 18. In step 2, the BTS 18 appends the PCI to the origination message received from the MS 22 and forwards this to the BSC 14. In step 3, the BSC 14 sends the origination message including the PCI to the current MSC 10. The current MSC 10 extracts the PCI from the incoming origination message and updates the relevant record in the VLR with the information contained in the PCI. In step 4, the current MSC 10 sends an assignment request to the BSC 14 instructing the BSC to move the MS 22 to a traffic channel. At this point, the BSC 14 may assign the MS to a different carrier frequency or band class than was previously assigned, and hence to a different PCI. In step 5, a channel assignment is sent to the BTS 18, and in step 6 this is forwarded to the MS 22. In step 7 the MS 22 acknowledges receipt of the channel assignment message from the BTS 18, and in step 8 the BTS acknowledges receipt of the channel assignment message from the BSC 14. Finally, in step 9, an assignment complete message is sent from the BSC 14 to the current MSC 10 again containing the PCI for the MS 22. This PCI will be different from the PCI contained in the message sent in the above described step 3 if the BSC 14 made a change in the carrier frequency or band class. The current MSC 10 then updates the VLR with the new band class and frequency information. The origination processing then continues on as normal.

VLR update may also be achieved through mobile termination message flow. A termination occurs when a call is set up to the mobile station. The first step in a termination is for the MSC to locate the MS with a page request to the MS. Following this, the message flow for a termination is basically the same as for an origination with the exception of the fact that the origination messages are replaced by page response messages.

In FIG. 4, VLR update is achieved through a mobile handoff complete message flow. A hard handoff occurs when a switch is made from a first BTS (current BTS) to a second BTS (target BTS) and the carrier frequency and bandclass may change. This is due to the movement of the MS for example. After a MS is directed to the target BTS from the current BTS via a handoff direction message (not shown), the mobile switches frequencies and reports to the target BTS. It is in the message flow involved with reporting to the target BTS that VLR update occurs for this example. Referring to FIG. 1, it is assumed for this example that BTS 20 is the target BTS and that BTS 18 is the current BTS. In step 1, the MS 22 sends a "mobile on channel" message to the target BTS 20, this being the new BTS. In step 2, the target BTS 18 forwards the mobile on channel message to the target BSC 16 for the target BTS including the PCI of the MS 22, BSC 16 being the new BSC. In this example, the target BSC is different from the current BSC but this may not necessarily be the case. The target BSC 14 sends a handoff complete message to the target MSC 12 including the PCI of the MS 22. The target MSC 12 then becomes the new current MSC and creates a new record in its VLR 24 for the MS 22, and extracts the PCI from the message and stores it in the newly created record.

When it is necessary to send a page message to a MS, PCI (in this example the band class and channel number that the MS is operating on) can be extracted from the VLR and used to direct the page message to a specific paging channel. This method of paging the MS may be used for any message that is sent on the paging channel. The messages that are effected by this will depend on the particular CDMA standard being employed. In the context of IS-634 for example, these are referred to as A-interface messages and include the Page_Request message, Feature_notification message, ADDS_Page message (for short message service), Authentication_Request message, SSD (shared secret data) Update Request, and the Base Station Challenge Response message.

Figure 5:
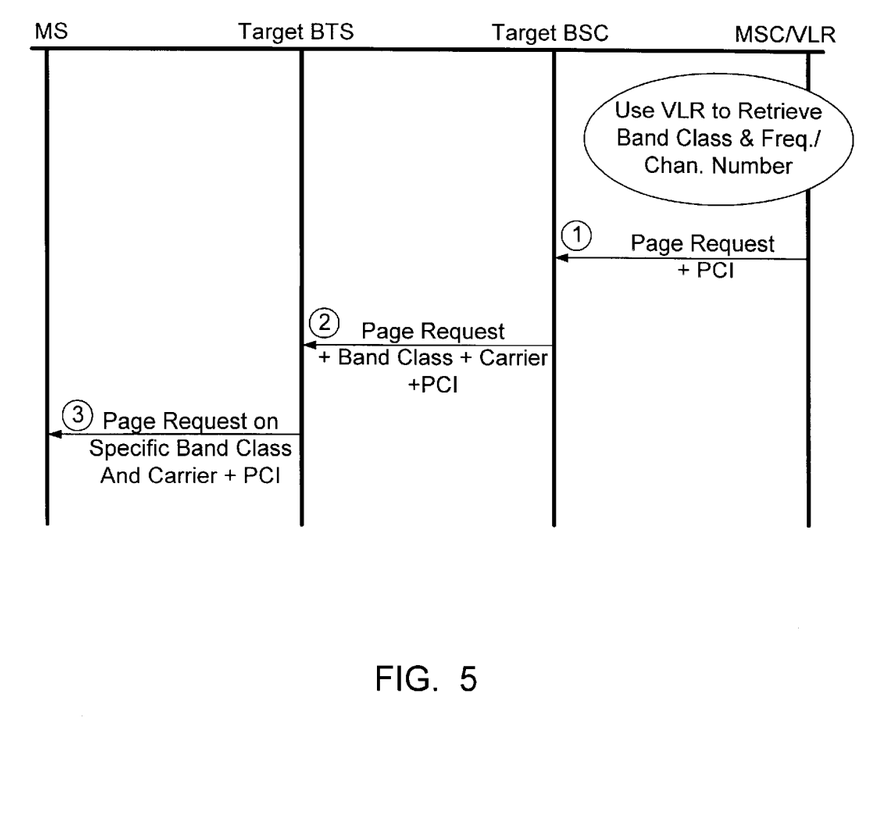
FIG. 5 is a message flow diagram for the delivery of a paging channel message.
Figure 6:
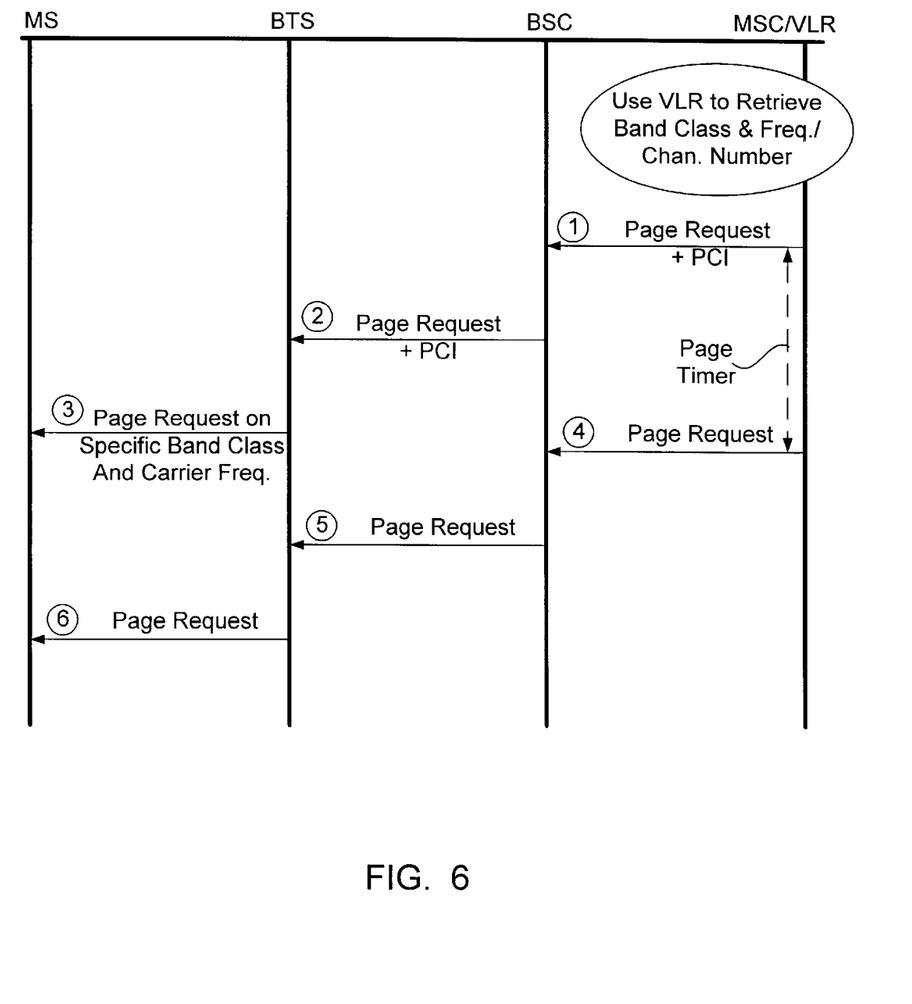
FIG. 6 is another message flow diagram for the delivery of a paging channel message with a retry on different carrier frequencies.

FIGS. 5 and 6 relate to paging channel message delivery flow. While these examples relate to sending a page request message on the paging channel, the message flow may be used for any paging channel message delivery to the mobile station. The purpose of a page request message is to determine the location of the MS.

Referring firstly to FIG. 5, before any message flows occur, an initial step in delivering a page to a particular MS 22 is for the current MSC 10 retrieve from its VLR 23 the PCI for the particular mobile station. The first message in the message flow is a page request sent from the current MSC 10 to all its BSCs 14 (only one message shown in message flow diagram). This page request is extended to include the PCI for the MS 22. Each BSC 14 then sends the page request including the PCI to its respective BTSs 18 (only one message shown in the message flow diagram). Each BTS 18 then extracts and removes the PCI from the page request message and broadcasts the page request message over its air interface on the paging channel associated with the extracted PCI.

Assuming that the MS 22 received the page request message, it would send an acknowledgement through normal channels to indicate this fact. If the message is not acknowledged, then a second attempt to find the MS's location is necessary. At this point, to ensure that the MS can be found, the MSC may attempt to page the MS on all carrier frequencies. In order to instruct the BSC to send the page message on the paging channels associated with all of the carrier frequencies, the MSC sends the page request message without the PCI. The absence of this information is an instruction to the BSCs and BTSs to send the message on all carrier frequencies and band classes. A message flow diagram for this scenario is shown in FIG. 6. Steps 1,2 and 3 are identical to those in FIG. 5. The current MSC 10 starts a paging timer when the page request message is sent. If the MS 22 fails to respond before a predetermined time, the timer will expire. Upon expiry of the timer, in step 4 the current MSC 10 sends a new page request message to the BSC 14 not including the band class and carrier frequency information. In step 5, the BSC 14 forwards this message to the BTS 18. In step 6, the BTS 18 broadcasts the page request on all paging channels.

Numerous modifications and variations of the present invention are possible in light of the above teachings. It is therefore to be understood that within the scope of the appended claims, the invention may be practised otherwise than as specifically described herein.

In addition to restricting page broadcast to a particular paging channel, it is also possible that the paging of the mobile station may be directed to a particular cell, group of cells or all cells.

In the above described example, both a band class and a channel number are included in a PCI used to identify the paging channel being monitored by the MS. Alternatively, any information which would permit the identification of the paging channel may be used. For example, the PCI may contain a single parameter which uniquely identifies both the band class and the channel number. It may be that in some systems, there is no concept of band class, but rather simply a plurality of carriers each with a paging channel. In this case, the PCI need only identify the carrier.

Furthermore, it is possible that there may be more than one paging channel associated with a particular carrier, and that the mobile station may be monitoring one or more of these paging channels. In this case, the PCI need only permit the identification of which paging channel(s) the mobile station is monitoring.

In the illustrated embodiment, the PCI is structured such that the BSC is able to distinguish exactly which paging channel the mobile station is monitoring. Alternatively, the PCI may be structured to only permit the BSC to narrow down the paging channels the mobile station may be monitoring to a subset of all possible paging channels. The BSC would then send the page on each of paging channels in the narrowed down set of paging channels. For example, for the case in which there are band classes and channel numbers, using a PCI containing only the channel number would require the BTS to broadcast the page on the identified channel number for each band class.

Messages transmitted from a mobile station or basestation transceiver to a mobile switching centre often include a basestation identifier field which identifies the cell to which the message pertains. This field may be extended to include the PCI in which case the basestation identifier may be referred to as an extended basestation identifier. Alternatively, the PCI may be appended to other fields of messages, or placed in a completely new field.

In the illustrated examples, various messages have been identified using IS-95 or IS-634 standard names, for example. It is to be understood that the invention is not limited in its application to systems employing these particular standards. Any messaging protocol may be used which allows an MS to convey the PCI to an MSC and vice versa.

The embodiments of the invention in which an exclusive property or privilege is claimed are defined as follows:

1. In a CDMA (code division multiple access) communications system which can transmit messages on a plurality of different paging channels, a method for a mobile switching centre to send messages to mobile stations within its coverage area each mobile station monitoring a respective particular one of said paging channels, the method first comprising the step of:

for each mobile station, maintaining in a form accessible to the mobile switching centre a paging channel identifier which permits an identification of the particular paging channel the mobile station is monitoring;

for each message to be sent to a particular mobile station the method further comprising the steps of:

determining on the basis of the paging channel identifier associated with the particular mobile station the particular paging channel that the particular mobile station is monitoring; and broadcasting the message on the particular paging channel.

2. A method according to claim 1 wherein each paging channel identifier comprises a band class and a channel number for the associated mobile station to identify a carrier frequency within a band class that the mobile station is operating or monitoring.

3. A method according to claim 1 for use in a CDMA system wherein the mobile switching centre is connected to a plurality of basestation controllers each controlling a respective plurality of basestation transceivers, wherein the step of maintaining the information comprises the steps of:

each basestation transceiver including the paging channel identifier of the particular mobile station in messages to its basestation controller relating to the particular mobile station; and each basestation controller including the paging channel identifier of the particular mobile station in messages to the mobile switching centre relating to the particular mobile station.

4. A method according to claim 3 wherein said messages to the basestation controller and said messages to the mobile switching centre include registration messages.

5. A method according to claim 3 wherein said messages to the basestation controller and said messages to the mobile switching centre include origination messages and mobile termination messages.

6. A method according to claim 3 wherein said messages to the basestation controller and said messages to the mobile switching centre include hand off messages.

7. A method according to claim 1 for use in a CDMA system wherein the mobile switching centre is connected to a plurality of basestation controllers each controlling a respective plurality of basestation transceivers, wherein the steps of determining the particular paging channel and broadcasting the message on the particular paging channel comprise the steps of:

the mobile switching centre adding the paging channel identifier for the particular mobile station to the message, and sending the message to all of the basestation controllers;

each basestation controller sending the message including the paging channel identifier to all of the basestation transceivers under its control; and each basestation transceiver broadcasting the message over its air interface on the particular paging channel identified by the paging channel identifier.

8. A method according to claim 7 wherein said message is either a Page_Request message, Feature_notification message, ADDS_Page message, Authentication_Request message, SSD (shared secret data) Update Request, and the Base Station Challenge Response message.

9. A method according to claim 1 further comprising the steps of:

rebroadcasting the message on all paging channels if there is no acknowledgement to the message broadcast on the particular paging channel within a predetermined time.

10. A basestation transceiver according to claim 9 further adapted to:

rebroadcast the page message on all paging channels if there is no acknowledgement to the page message within a predetermined time.

11. A CDMA basestation controller according to claim 1 wherein each paging channel identifier comprises a band class and a channel number for the particular mobile station to identify a carrier frequency within a band class that the mobile station is operating or monitoring.

12. A CDMA mobile switching centre according to claim 11 wherein each paging channel identifier comprises a band class and a channel number for the associated mobile station to identify a carrier frequency within a band class that the mobile station is operating or monitoring.

13. A CDMA basestation transceiver for connection to a basestation controller, the CDMA basestation transceiver being adapted to transmit messages on a plurality of different paging channels, and being adapted to:

1) include a paging channel identifier permitting the identification of a particular one of the plurality of paging channels that a particular mobile station is monitoring in messages to the basestation controller relating to the particular mobile station;

2) when a message to be sent to a particular mobile station including said paging channel identifier is received from the basestation controller for transmission, identify the paging channel the particular mobile station is monitoring on the basis of the paging channel identifier, and send the message over that paging channel.

14. A basestation transceiver according to claim 13 said message is either a Page_Request message, Feature_notification message, ADDS_Page message, Authentication_Request message, SSD (shared secret data) Update Request, and the Base Station Challenge Response message.

15. A basestation transceiver according to claim 13 wherein each paging channel identifier comprises a band class and a channel number for the particular mobile station to identify a carrier frequency within a band class that the mobile station is operating or monitoring.

16. A basestation transceiver according to claim 13 wherein said messages to the basestation controller include registration messages.

17. A basestation transceiver according to claim 13 wherein said messages to the basestation controller include origination messages and mobile termination messages.

18. A basestation transceiver according to claim 13 wherein said messages to the basestation controller and said messages to the mobile switching centre include hand off messages.

19. A CDMA basestation controller for connection to a mobile switching centre and to a plurality of basestation transceivers each capable of transmitting messages on a plurality of different paging channels, the basestation controller being adapted to:

1) receive a paging channel identifier permitting the identification of a particular one of said paging channels that a particular mobile station is monitoring in messages received from any basestation transceiver relating to the particular mobile station;

2) include the paging channel identifier in messages to the mobile switching centre relating to the particular mobile station;

3) when a message including said paging channel identifier is received from the mobile switching centre for transmission to the particular mobile station, forward the message including said paging channel identifier to the basestation transceivers.

20. A CDMA basestation controller according to claim 19 wherein said message is either a Page_Request message, Feature_notification message, ADDS_Page message, Authentication_Request message, SSD (shared secret data) Update Request, and the Base Station Challenge Response message.

21. A CDMA basestation controller according to claim 19 wherein said messages to the mobile switching centre include registration messages.

22. A CDMA basestation controller according to claim 19 wherein said messages to the mobile switching centre include origination messages and termination messages.

23. A CDMA basestation controller according to claim 19 wherein said messages to the basestation controller and said messages to the mobile switching centre include hand off messages.

24. A CDMA mobile switching centre for connection to a basestation controller in a CDMA communication system having a plurality of paging channels and adapted to:
  1) receive a paging channel identifier permitting the identification of a particular one of said paging channels that a particular mobile station is monitoring in messages received from the basestation controller relating to the particular mobile station;
  2) store the paging channel identifier; and
  3) include the paging channel identifier in messages to the basestation controller relating to the particular mobile station.

25. In a CDMA (code division multiple access) communications system which can transmit messages on a plurality of different paging channels within a system coverage area, a method of sending messages to mobile stations within the system coverage area each mobile station monitoring a respective particular one of said paging channels, the method first comprising the step of:
  for each mobile station, maintaining a paging channel identifier which permits an identification of the particular paging channel the mobile station is monitoring;
  for each message to be sent to a particular mobile station the method further comprising the steps of:
  determining on the basis of the paging channel identifier associated with the particular mobile station the particular paging channel that the particular mobile station is monitoring; and
  broadcasting the message on the particular paging channel.

26. A method according to claim 25 wherein each paging channel identifier comprises a band class and a channel number for the associated mobile station to identify a carrier frequency within a band class that the mobile station is operating or monitoring.

27. A method according to claim 25, wherein each paging channel identifier is stored in a visitor location registry.

* * * * *